United States Patent [19]

Blackman et al.

[11] Patent Number: 5,125,549
[45] Date of Patent: Jun. 30, 1992

[54] METHOD AND APPARATUS FOR SCORING AND BREAKING AN OPTICAL FIBER

[75] Inventors: Loyd T. Blackman, Raleigh; Aldert S. Root, III, Cary; Thomas W. Whitehead, Raleigh, all of N.C.

[73] Assignee: E. I. Du Pont de Nemours and Company, Wilmington, Del.

[21] Appl. No.: 471,823

[22] Filed: Jan. 25, 1990

[51] Int. Cl.[5] .............................................. C03B 37/16
[52] U.S. Cl. ...................................... 225/96.5; 225/105
[58] Field of Search .................... 225/2, 96, 96.5, 105

[56] References Cited

U.S. PATENT DOCUMENTS

| | | | |
|---|---|---|---|
| 4,202,475 | 5/1980 | Hirai et al. | 225/2 |
| 4,229,876 | 10/1980 | Doty | 225/96.5 |
| 4,322,025 | 3/1982 | Johnson | 225/96.5 |
| 4,459,746 | 7/1984 | Goodman | 225/2 |
| 4,463,886 | 8/1984 | Thornton | 225/96.5 |
| 4,619,387 | 10/1986 | Shank et al. | 225/96.5 |
| 4,627,561 | 12/1986 | Balyasny et al. | 225/2 |
| 4,644,647 | 2/1987 | Szostak et al. | 30/164.9 |
| 4,688,707 | 8/1987 | Szostak et al. | 225/96.5 |

OTHER PUBLICATIONS

"Design and Testing of the Lightlock Fiber Optic Splice," authored by T. W. Whitehead et al., was presented at a meeting of the Society of Photooptical Instrumentation Engineers (SPIE) which met in Boston, Mass., on Sep., 1989.
"Operating Manual-Optical Fiber Cutter," by the Furukawa Electric Co., Ltd., of Tokyo, Japan, dated Mar. 1985.

*Primary Examiner*—Hien H. Phan
*Attorney, Agent, or Firm*—John E. Griffiths

[57] ABSTRACT

The present invention relates to a method and apparatus for scoring and breaking an optical fiber and, specifically, for scoring and breaking an optical fiber near a ferrule forming an end face substantially normal to the longitudinal axis of the optical fiber.

10 Claims, 6 Drawing Sheets

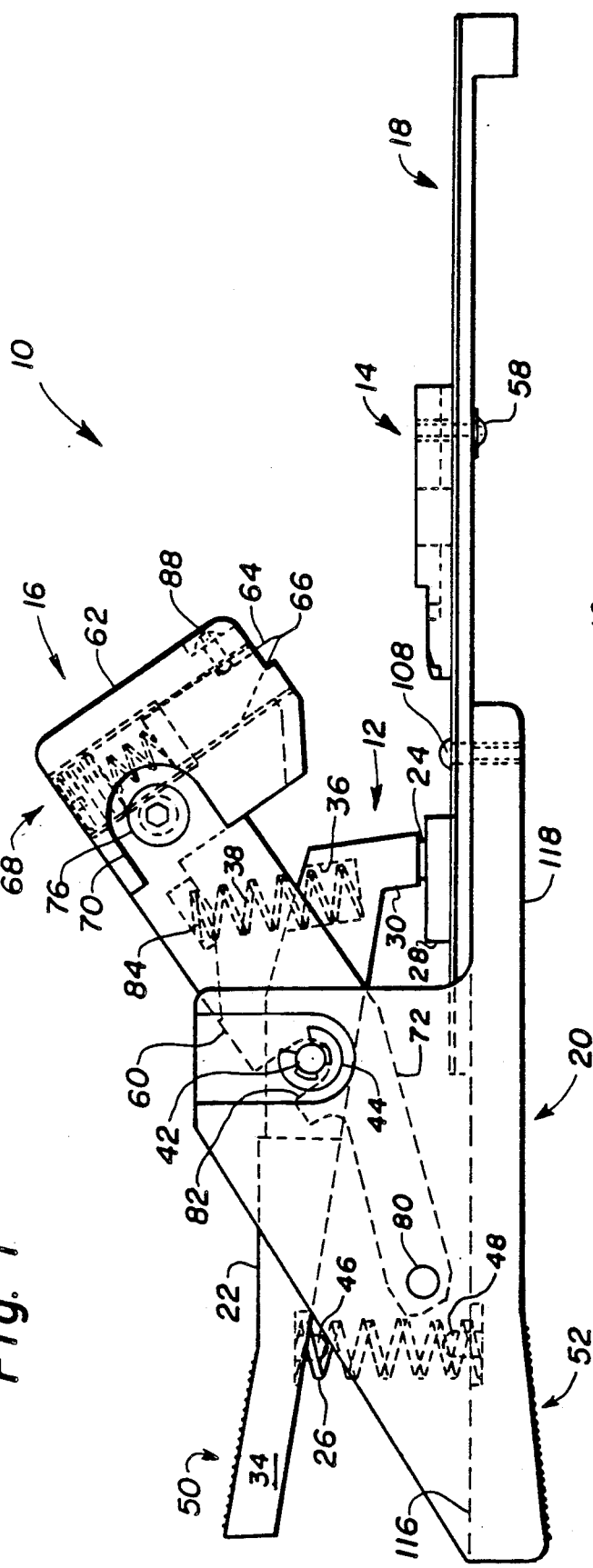

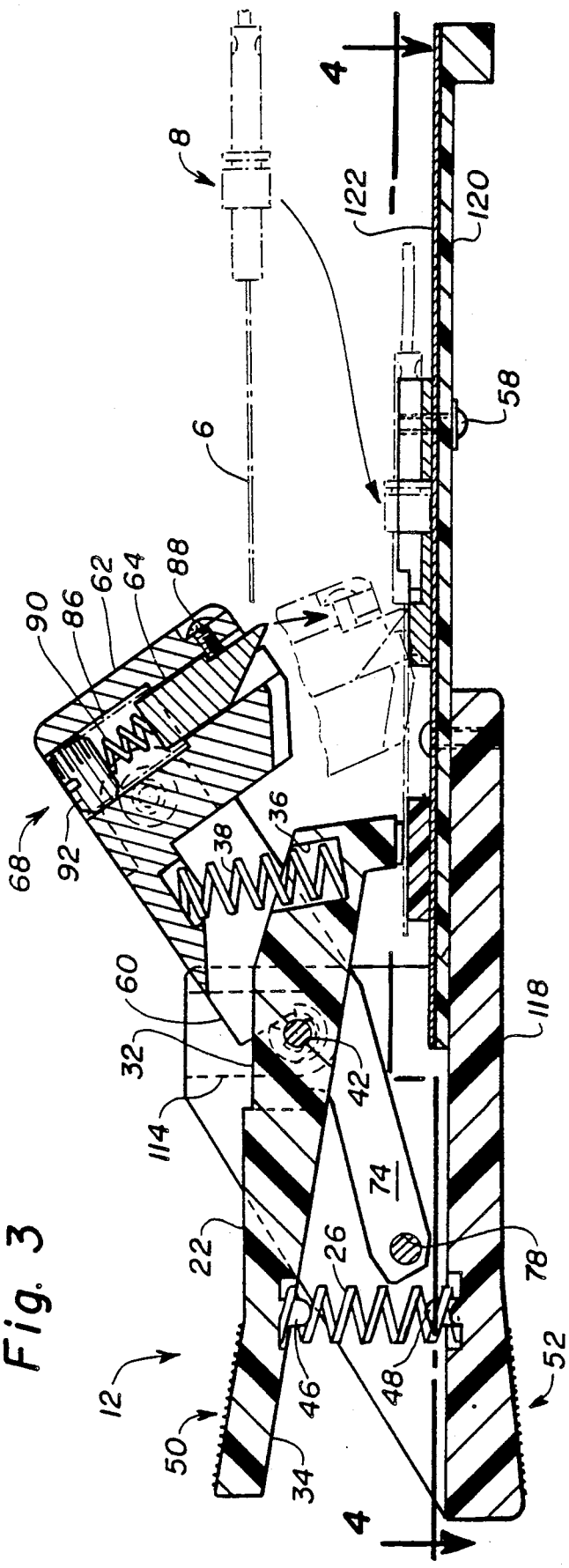

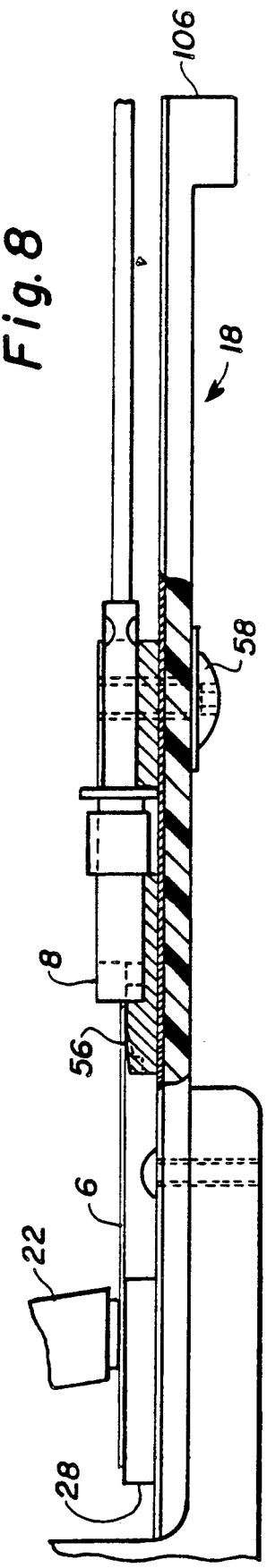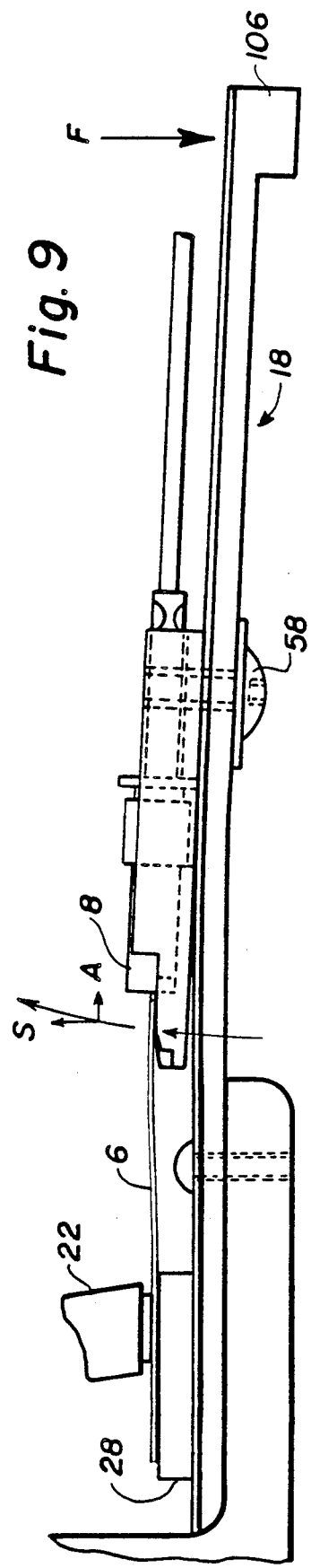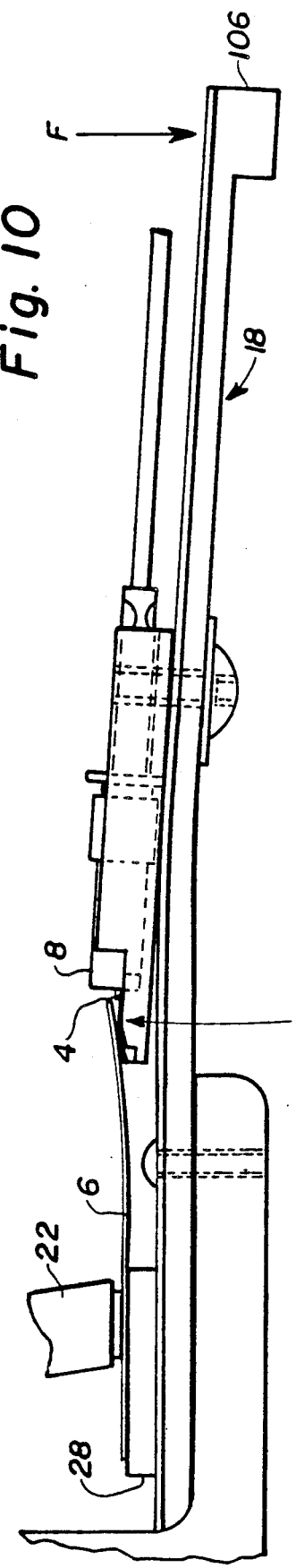

METHOD AND APPARATUS FOR SCORING AND BREAKING AN OPTICAL FIBER

BACKGROUND OF THE INVENTION

1. Field of the Invention

This invention relates to a method and apparatus for scoring and breaking an optical fiber and, specifically, for scoring and breaking an optical fiber near a ferrule forming an end face substantially normal to the longitudinal axis of the optical fiber.

2. Description of Related Art

It is now well known to use optical fibers in a multitude of systems including telecommunication and datacommunication systems. To install such systems, many connections must be made between ends of optical fibers.

A traditional way for making a connection between ends of two optical fiber cables is as follows. First, a buffer layer is removed from several inches of each of the cables near the ends to be joined. When the buffer is removed, the remaining optical fiber comprises a core surrounded by cladding which together have an outer diameter of about 125 microns ($\mu$m) which is about the diameter of a human hair. Second, each of the two thin fragile optical fibers is threaded by hand through a separate ferrule which can be either glued onto the optical fiber with, for instance, epoxy or fixed to the the optical fiber by crimping, i.e., squeezing and deforming, a portion of the ferrule firmly around the optical fiber. Traditionally, ferrules were epoxied onto the fibers. More recently, the industry is inclined to crimp ferrules on fibers because it takes significantly less time, i.e., one does not have to wait for the epoxy to dry. Third, the optical fiber extending beyond the end of each of the ferrules is cleaved, which entails scoring and breaking the optical fiber, about one diameter or 125 $\mu$m beyond the end of the ferrule. Fourth, the ends of the optical fibers are polished, typically, first with a course, e.g., 12 $\mu$m, grit paper until the ends extend about 20 to 25 $\mu$m beyond the end of the corresponding ferrules and then with one or more finer, e.g., 1 $\mu$m and/or 0.3 $\mu$m, grit papers until the ends of the optical fibers are flush with the end of their corresponding ferrules. Due to the size of the optical fibers, this polishing requires the skill of an experienced individual to make an acceptable end. Finally, the ferrules are manually inserted into a connector housing assembly which is intended to position the optical fibers such that they are adjacent to one another with their optical axes in alignment with respect to each other. This is a time consuming process which requires skill and, as a result, is costly.

Further, the final condition of the ends of the optical fibers affects the power transmission capabilities of the connection. Ideally, each end has a mirror finish and is perpendicular to the longitudinal axis of the optical fiber. However, polishing of the ends of the optical fibers, especially with the courser grit paper, does result in defects, such as cracks, chips and scratches in the end faces. Such defects are very difficult to see with the natural eye and may require the above described process to be redone creating a new end face.

The cleaving process of scoring and breaking an optical fiber can produce a good break resulting in an optical fiber end that is quite smooth and substantially perpendicular to the optical fiber longitudinal axis. However, once the ferrule is attached to the optical fiber there was no tool in the prior art for cleaving the fiber substantially near the ferrule so that typical polishing can be reduced.

Efforts were made to crimp a ferrule onto a fiber that had a cleaved end so that the ferrule end and the cleaved optical fiber end would coincide in the same plane. However, the crimping caused an unpredictable shift or movement between the fiber and the ferrule such that the ends of the ferrule and the fiber were not always coincident.

It is an object of this invention to provide an apparatus for cleaving an optical fiber near a ferrule so that typical polishing can reduced.

It is an object of this invention to provide an apparatus for scoring and breaking an optical fiber near a ferrule forming an end face in the fiber substantially normal to the longitudinal axis of the fiber.

It is an object of this invention to provide an apparatus that can be used after a ferrule is connected to an optical fiber to score and break the fiber near the ferrule forming the end face substantially normal to the longitudinal axis of the fiber.

SUMMARY OF THE INVENTION

The present invention relates to an apparatus for preparing an end face of an optical fiber having a longitudinal axis and a ferrule connected to the fiber near the end face, the apparatus comprising:

means for scoring and breaking the fiber near the ferrule forming the end face substantially normal to the axis.

The invention is further directed to a method of preparing an end portion of an optical fiber having a longitudinal axis comprising the steps of:

connecting a ferrule to the optical fiber;

scoring the optical fiber at a point near the ferrule; and breaking the fiber at the point of scoring forming an end face substantially normal to the axis.

BRIEF DESCRIPTION OF THE DRAWINGS

The invention can be more fully understood from the following detailed description thereof in connection with accompanying drawings which form a part of this application and in which:

FIG. 1 is a front side elevation view of an optical fiber cleaver in accordance with the present invention.

FIG. 2 is a top plan view of the optical fiber cleaver shown in FIG. 1.

FIG. 3 is a vertical sectional view of the cleaver taken generally along line 3—3 in FIG. 2, looking in the direction of the arrows.

FIG. 4 is a horizontal sectional view of the cleaver taken generally along line 4—4 in FIG. 1, looking in the direction of the arrows.

FIG. 8 is an illustration of a front side view of a portion of the cleaver holding an optical fiber connected to a ferrule, the cleaver having a flexible resilient member in an unbent position.

FIG. 9 is an illustration of the cleaver assembly as shown in FIG. 8 with its flexible resilient member in a first bent position.

FIG. 10 is an illustration of the cleaver assembly as shown in FIG. 8 with its flexible resilient member in a second bent position.

DESCRIPTION OF THE PREFERRED EMBODIMENT(S)

Figure 5:
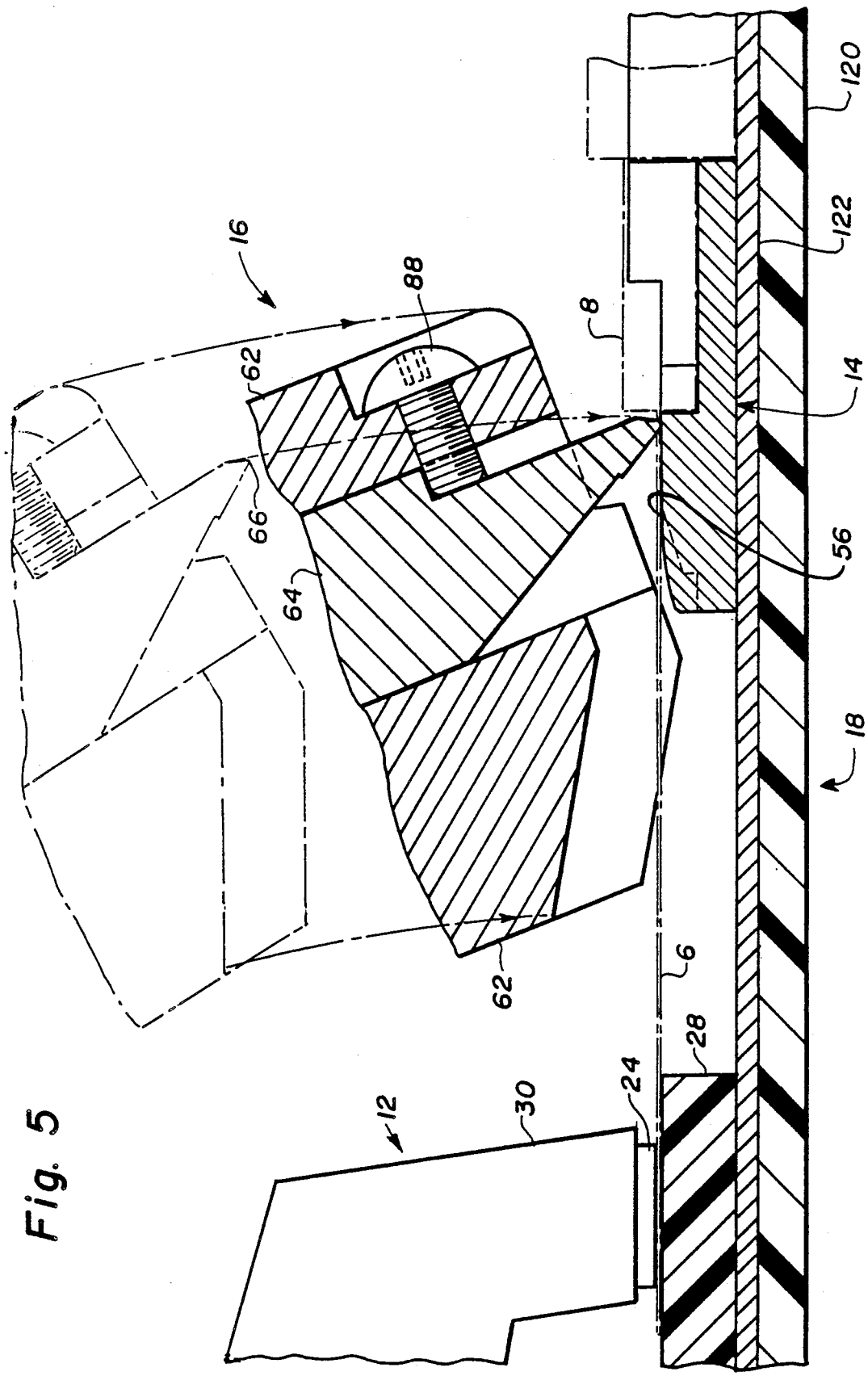
FIG. 5 is a fragmentary enlarged view of the cleaver blade contacting an optical fiber near a ferrule held by the cleaver of the present invention.

Throughout the following detailed description, similar reference numerals refer to similar elements in all Figures of the drawings.

Referring to FIG. 1, there is depicted a front side elevation view of an optical fiber cleaver 10 in accordance with the present invention. FIG. 2 is a top plan view of the optical fiber cleaver 10 shown in FIG. 1.

The optical fiber cleaver 10 generally comprises an apparatus 10 for preparing an end face of an optical fiber having a longitudinal axis and a ferrule connected to the fiber near the end face. The apparatus 10 comprises means 10 for scoring and breaking the fiber near the ferrule forming the end face substantially normal to the axis. For the purposes of this disclosure, "near" the ferrule is defined to mean about 25 microns ($\mu$m) or less from the ferrule or, in other words, near enough to the ferrule to eliminate the need to polish the end face with course polishing means, such as, greater than 1 $\mu$m grit papers. Further, the scoring and breaking means 10 is adapted to produce axial and shear forces in the fiber at or substantially at a point of scoring.

The scoring and breaking means 10 comprises means 12 for gripping the fiber; means 14 for holding a ferrule connected to the fiber; means 16 for scoring the fiber at a point near the ferrule; means 18 for providing tensile and shearing forces to the fiber at or near the scoring point to break the fiber forming an end face lying substantially in a plane substantially normal to the longitudinal axis of the fiber; and means 20 for supporting the means 12 for gripping, the means 14 for holding, the means 16 for scoring and the means 18 for providing.

The gripping means 12 comprises a gripper arm 22, an optical fiber contact element 24, a compression spring 26 and a gripper pad 28. The gripper arm 22 has a first end portion 30, an intermediate portion 32 and a second end portion 34. The optical fiber contact element 24 is attached to the arm first end portion 30 and is for contacting or pressing the optical fiber between the contact element 24 and the gripper pad 28. The gripper pad 28 can be connected by any means, such as, by two sided adhesive tape (not depicted), to the supporting means 20 or the providing means 18 which itself is connected to the supporting means 20. The arm first end portion 30 further has an indentation 36 for receiving one end of a compression spring 38 which can be considered part of the scoring means 16 and is positioned between the gripper arm 22 and the remainder of the scoring means 16.

A passage or bore 40 extends through the intermediate portion 32. A dowel or shaft 42 which can be considered part of the supporting means 20 extends through the bore 40 and is connected to the remainder of the supporting means 20 at both ends of the shaft 42, such as, with locking washers 44. The arm 22 is capable of pivoting or rotating about the shaft 42 or the shaft 42 is capable of pivoting or rotating with respect to the remainder of the supporting means 20.

The arm second end portion 34 has a protrusion 46 extending towards the supporting means 20. The supporting means 20 has a corresponding protrusion 48 extending towards the arm second end portion 34. The spring 26 is positioned between the supporting means 20 and the arm second end portion 34 with one end of the spring 26 around the protrusion 46 on the arm 22 and the other end of the spring 26 around the protrusion 48 on the supporting means 20. The spring 26 is for biasing the arm second end portion 34 away from, and the optical fiber contact element 24 towards, the supporting means 20. Instead of protrusions 46 and 48, the spring 26 can be connected by any means to the gripper arm 22 and the supporting means 20, such as by locating ends of the spring 26 in indentations in the gripping arm 22 and the supporting means 20. These alternative means are considered equivalents throughout this disclosure.

The arm second end portion 34 and the supporting means 20 can optionally have distal surfaces 50 and 52, respectively, with ridges to reduce slippage when the surfaces 50 and 52 are grasped between an operator's fingers. The details of the gripping means 12 can also be seen in FIG. 3 which is a vertical sectional view of the cleaver 10 taken generally along line 3—3 in FIG. 2, looking in the direction of the arrows.

FIGS. 3, 4 and 5 illustrate the gripping means 12 holding an optical fiber 6 and a ferrule 8 on the optical fiber 6 in the holding means 14 where the optical fiber 6 and the ferrule 8 are indicated by phantom lines. FIG. 4 is a horizontal sectional view of the cleaver 10 taken generally along line 4—4 in FIG. 1, looking in the direction of the arrows.

The holding means 14 comprises a ferrule holder 14. The ferrule holder 14 has an indentation 54 for receiving substantially half of the ferrule 8. The ferrule holder 14 further has a platform 56 which extends towards the gripping means 12. The platform 56 is shaped such that when the optical fiber is held by the gripping means 12, the ferrule 8 is held by the ferrule holder 14, and the providing means 18 in an unstressed state, then the optical fiber 6 connected to the ferrule 8 extends over the platform 56 towards the gripping means 12 with the platform 56 contacting the optical fiber 6 near the ferrule 8 and spaced from the optical fiber 6 farther from the ferrule 8. This is best seen in FIG. 5. An end portion of the ferrule holder 14 farthest from the gripping means 12 is connected, such as, by screw assemblies 58, to the providing means 18. This manner of connecting the ferrule holder 14 to the providing means 18 enables the platform 56 to slightly rise and separate from the providing means 18 when a force is applied down on the providing means 18 at the position indicated by the arrow F in FIG. 9. The rising platform 56 exerts a shear force S through the optical fiber 6 near the ferrule 8 and substantially normal to the longitudinal axis of the optical fiber 6.

The scoring means 16 comprises a pair of scoring arms 60, a scoring head 62, a scoring blade 64 having an edge 66, means 68 for biasing the scoring blade edge 66 towards an extended position with a variable biasing force, and the compression spring 38. Each of the scoring arms 60 has a first end portion 70, an intermediate portion 72 and a second end portion 74. Each scoring arm first end portion 70 is connected to the scoring head 62, such as, by screws 76.

A passage or bore 78 extends through each scoring arm second end portion 74. A dowel or shaft 80 which can be considered part of the supporting means 20 extends through the bores 78 and is connected to the remainder of the supporting means 20 at both ends of the shaft 80. The scoring arms 60 are capable of pivoting or rotating about the shaft 80 or the shaft 80 is capable of pivoting or rotating with respect to the remainder of the supporting means 20.

One of the scoring arms 60 is positioned on either side of the gripper arm 22. Both of the scoring arms 60 extend from the shaft 80, between the shaft 42 and the gripper pad 28, to the scoring head 62. Notches 82 are in the intermediate portions 72 of each of the scoring arms 60 for receiving the shaft 42 when the scoring arms 60 are pivoted counterclockwise in FIGS. 1 and 3 as biased by the spring 38.

The scoring head 62 has an indentation 84 for receiving one end of the compression spring 38 which is positioned between the scoring means 16 and the gripper arm 22 to bias them apart. The scoring head 62 further has a passage 86 for receiving the scoring blade 64 and the means 68 for biasing the scoring blade edge 66 towards an extended position with a variable biasing force. Means 88, such as a button head screw 88, can be used to support the scoring blade 64 in the passage 86 at its lowest or most extended position. The biasing means 68 can comprise a compression spring 90 positioned in the passage 86 between the scoring blade 64 and a blade adjusting screw 92 threadably attached within an end of the passage 86. A set screw (not depicted) can be provided to fix the blade adjusting screw 92 in position after it has been adjusted to provide the desired force on the blade 64. The scoring head 62 is shaped so that when a ferrule 8 is in the ferrule holder 14, the optical fiber 6 is held by the gripper arm 22 and the head 62 is forced towards the ferrule holder 14, then the blade 64 scores the optical fiber 6 near the ferrule 8 above the platform 56.

As such, when the gripping means 12 grips the fiber 6, the holding means 14 holds the ferrule 8 connected to the fiber 6 and the scoring head 62 is pivoted towards the ferrule holder 14, the scoring blade edge 66 swings in an arc to near the ferrule 8, then contacts the optical fiber 6, scores the optical fiber 6 and, if a predetermined amount of pressure is exerted on the scoring blade 64, the blade 64 slides with respect to the scoring head 62 compressing the biasing means 68. FIGS. 3 and 5 illustrate the position of the scoring blade 64 spaced from the optical fiber 6 and in contact with the optical fiber 6.

Preferably, the scoring means 16 is pivotably connected to the supporting means 20 such that when the scoring blade 64 is pivoted to contact the optical fiber 6, the force applied by the scoring blade 64 on the optical fiber 6 is substantially normal to the longitudinal axis of the fiber 6. This can be seen in FIG. 5 which is a fragmentary enlarged view of the cleaver blade 64 contacting an optical fiber 6 near a ferrule 8 held by the cleaver 10 of the present invention. In order to make the force applied by the scoring blade 64 on the optical fiber 6 to be substantially normal to the longitudinal axis of the fiber 6, one can locate the longitudinal axis of symmetry of the shaft 78 and the point of scoring on the optical fiber 6 in a plane substantially parallel to the longitudinal axis of the optical fiber 6.

Figure 6:
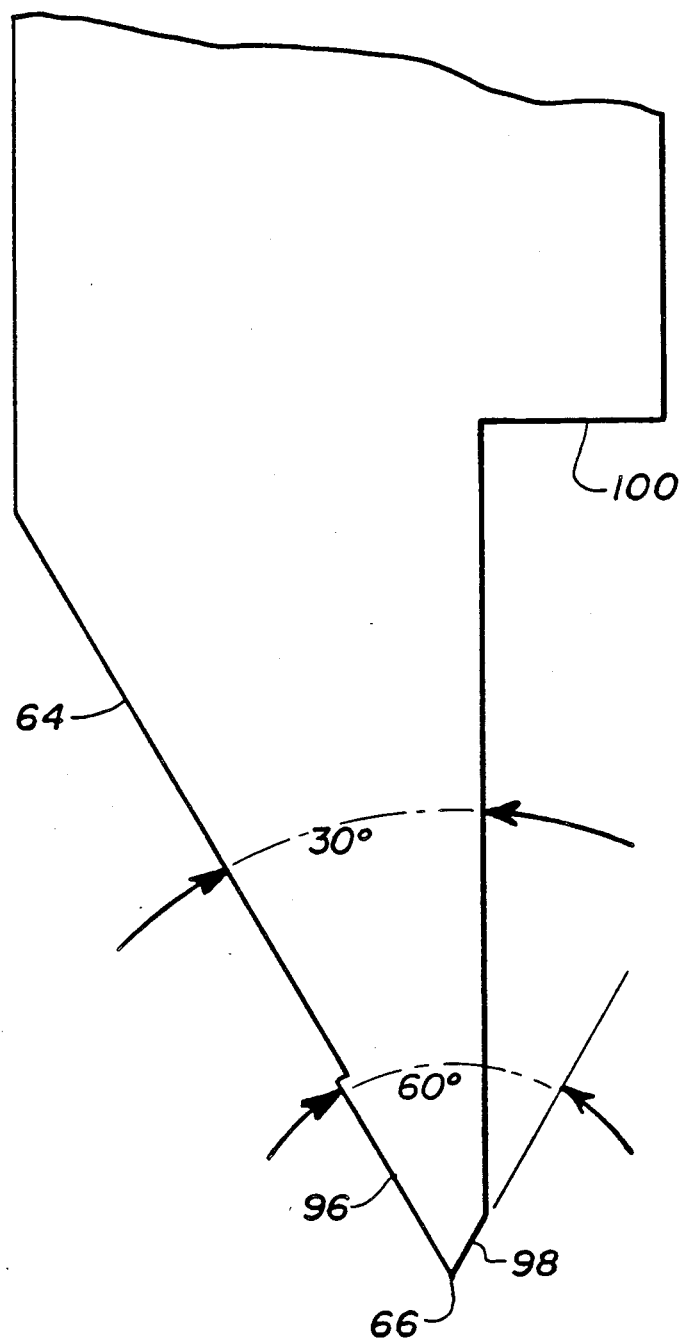
FIG. 6 is a fragmentary enlarged view of a tip of the cleaver blade.

Also preferably, the scoring blade edge 66 is defined by two intersecting surfaces 96 and 98 of the scoring blade 64 where the two surfaces 96 and 98 have an angle of or about 60 degrees between them. The scoring blade 64 also has a shoulder 100 for resting on the button head screw 88. See FIG. 6 which is a fragmentary enlarged front side view showing one point of the edge 66 of the cleaver blade 64. The edge 66 extends perpendicularly into FIG. 6.

The providing means 18 comprises a flexibly resilient member 18. The flexibly resilient member 18 has a first end portion 102, an intermediate portion 104 and a second end portion 106. The first end portion 102 is connected, such as, by screws 108, to the supporting means 20. The intermediate portion 104 and the second end portion 106 extend from the supporting means 20. The intermediate portion 104 is connected, such as, by the screw assemblies 58, to the means 14 for holding. The flexibly resilient member 18 may comprise a layer 120 of flexibly resilient polymeric material laminated to a flexibly resilient metallic layer 122. Thus, when the means 12 for gripping grips the fiber 6, the means 14 for holding holds the ferrule 8 connected to the fiber 6, the fiber 6 is scored at a point near the ferrule 8 by the means 16 for scoring, and the flexibly resilient member second end portion 106 is pushed away from the means 16 for scoring, then tensile and shearing forces are applied to the fiber 6 at or near the scoring point to break the fiber 6 forming an end face 4 lying substantially in a plane substantially normal to the longitudinal axis of the fiber 6 near the ferrule 8.

The supporting means 20 comprises a base 110 connected to two spaced apart side walls 112. The shafts 42 and 80 extend between and are supported by the side walls 112. The side walls 112 may have recessed regions 114 for housing the locking washers 44. The protrusion 48 is on a top 116 side of the base 110 extending between the side walls 112 toward the gripper arm 22. Distal surface 52 with the ridges is on a bottom side 118 of the base 110 opposite the top side 116 with the protrusion 48.

Figure 7:
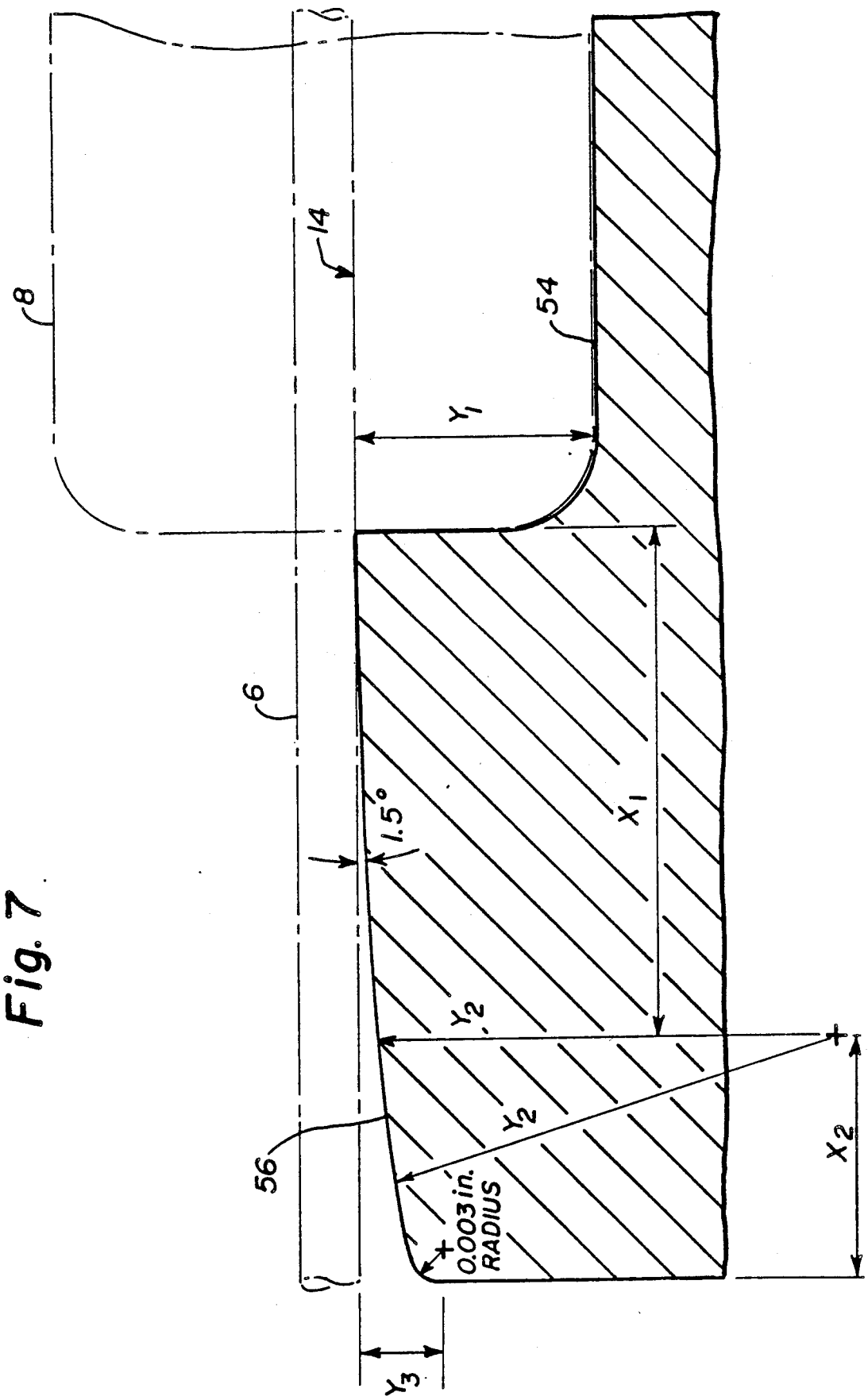
FIG. 7 is a schematic illustration of an enlarged profile of part of a ferrule holder taken generally along line 7—7 in FIG. 4, looking in the direction of the arrows.

FIG. 7 is a schematic illustration of an enlarged profile of part of a ferrule holder taken generally along line 7—7 in FIG. 4, looking in the direction of the arrows. FIG. 7 can be used to illustrate preferred dimensions of the platform 56 for use with optical fibers 6 having claddings 3 with different diameters. The preferred dimensions of the platform 56 differ depending on the size of the outer diameter of the optical fiber 6 to be scored and broken.

Referring to FIG. 7, the depth $Y_1$ of the indentation 54 should be just deep enough (1) to cause the optical fiber 6 to touch the platform 56 where the platform 56 meets the indentation 54, and (2) at the same time, to permit the ferrule 8 to rest on the bottom of the indentation 54. For instance, for use with optical fibers 6 having claddings 3 with outer diameters of 125 $\mu$m and 250 $\mu$m, $Y_1$ is preferably 0.0445 inches (1112.5 $\mu$m) and 0.0447 inches (1117.5 $\mu$m), respectively. Preferably, the platform 56 extends from the indentation 54 downward at about 1.5 degrees (which is hereby defined to include an angle of 1.5 degrees) from a line parallel to the longitudinal axis of the optical fiber 6 when the fiber 6 is held by the gripping means 12 and the ferrule 8 rests in the indentation 54. In FIG. 7, the parallel line is the lower edge of the optical fiber 6. This inclined portion of platform 56 preferably extends a distance $X_1$ along the parallel line from the indentation 54. For instance, for use with optical fibers 6 having claddings 3 with outer diameters of 125 $\mu$m and 250 $\mu$m, $X_1$ is preferably about (which is hereby defined to include) 0.072 inches (1800 $\mu$m) and 0.090 inches (2250 $\mu$m), respectively. Then the platform 56 curves downward with a radius of $Y_2$ with the point of rotation of the curve being on a line perpendicular to the parallel line (the lower edge of the optical fiber 6 in FIG. 7) and passing through the end of the inclined portion of the platform 56 distal from the indentation 54. For instance, for use with optical fibers 6 having claddings 3 with outer diameters of 125 μm and 250 μm, $Y_2$ is preferably about (which is hereby defined to include) 0.220 inches (5500 μm) and 0.200 inches (5000 μm), respectively. This curved portion of the platform 56 preferably extends a distance $X_2$ along the parallel line from the perpendicular line passing through the end of the inclined portion of the platform 56 distal from the indentation 54. For instance, for use with optical fibers 6 having claddings 3 with outer diameters of 125 μm and 250 μm, $X_2$ is preferably about (which is hereby defined to include) 0.058 inches (1450 μm) and 0.040 inches (1000 μm), respectively. A curved edge having a radius of 0.003 inches (75 μm) can couple the curved portion of the platform 56 to an end wall of the holder 14. The point of rotation of the 0.003 inch radius is preferably a distance $Y_3$ from the parallel line from the indentation 54. For instance, for use with optical fibers 6 having claddings 3 with outer diameters of 125 μm and 250 μm, $Y_3$ is preferably about (which is hereby defined to include) 0.012 inches (300 μm) and 0.009 inches (225 μm), respectively.

The present invention is further directed to a method of preparing an end portion of an optical fiber 6 having a longitudinal axis comprising the steps of: connecting a ferrule 8 to the optical fiber 6; scoring the optical fiber 6 at a point near the ferrule 8; and breaking the fiber 6 at the point of scoring forming an end face 4 substantially normal to the axis. The breaking step produces axial A and shear S stresses or forces in the fiber 6 at or substantially at the point of scoring. As noted before, the end face 4 created by this method is about 25 microns or less from the ferrule 8.

FIG. 3 illustrates the connecting and scoring steps of this method using the apparatus 10 of the present invention.

FIGS. 8, 9 and 10 illustrate the breaking step of this method at three points in time. FIG. 8 shows the optical fiber 6 gripped by the gripper arm 22 and the ferrule 8 held by the ferrule holder 14. FIG. 8 illustrates a first point of time just after the optical fiber 6 has been scored by the scoring means 16 and just before any force is applied to the second end portion 106 of the resilient member 18. In FIG. 8, no stress is in the optical fiber 6 on the platform 56. FIG. 9 illustrates a second point in time, after the first point in time, when a force F is being applied to the second end portion 106 of the resilient member 18, but before the optical fiber 6 breaks. FIG. 9 shows that shear S and axial A stresses are produced in the optical fiber 6 above the platform 56 near the ferrule 8. FIG. 10 shows a third point in time, after the second point of time, where the optical fiber 6 has broken forming an end face 4 near the ferrule 8. The distance that the end face 4 is from the ferrule 8 in FIG. 8 is exaggerated for the benefit of the illustration. However, in reality the end face 4 formed by the apparatus 10 of the present invention is about 25 microns (μm) or less from the ferrule 8 or, in other words, near enough to the ferrule 8 to eliminate the need to polish the end face 4 with course polishing means, such as, greater than 1 μm grit papers.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for preparing an end face of an optical fiber having a longitudinal axis and a ferrule connected to the fiber near the end face, the apparatus comprising:

means for scoring and breaking the fiber near the ferrule forming the end face substantially normal to the axis, wherein the means for scoring and breaking comprises:

means for gripping the fiber;

means for holding a ferrule connected to the fiber, wherein the means for holding comprises:

a ferrule holder having an indentation for receiving substantially half of the ferrule; and a platform having an inclined portion and a curved portion, the inclined portion extending from the indentation downward at an angle of about 1.5 degrees from a line parallel to the longitudinal axis of the optical fiber when the fiber is held by the gripping means and the ferrule rests in the indentation, the curved portion connected to the inclined portion;

the inclined portion extending a distance X along the parallel line from the indentation and the curved portion having a radius of Y with the point of rotation of the curved portion being on a line perpendicular to the parallel line where X is about 0.072 inches (1800 μm) and Y is about 0.220 inches (5500 μm), such that when the ferrule is held by the ferrule holder with the means for providing in an unstressed state, the optical fiber connected to the ferrule extends over the platform with the platform contacting the optical fiber near the ferrule and spaced from the optical fiber farther from the ferrule;

means for scoring the fiber at a point near the ferrule;

means for providing tensile and shearing forces to the fiber at or near the scoring point to break the fiber forming an end face lying substantially in a plane substantially normal to the longitudinal axis of the fiber; and means for supporting the means for gripping, the means for holding, the means for scoring and the means for providing.

2. An apparatus for preparing an end face of an optical fiber having a longitudinal axis and a ferrule connected to the fiber near the end face, the apparatus comprising:

means for scoring and breaking the fiber near the ferrule forming the end face substantially normal to the axis, wherein the means for scoring and breaking comprises:

means for gripping the fiber;

means for holding a ferrule connected to the fiber, wherein the means for holding comprises:

a ferrule holder having an indentation for receiving substantially half of the ferrule; and a platform having an inclined portion and a curved portion, the inclined portion extending from the indentation downward at an angle of about 1.5 degrees from a line parallel to the longitudinal axis of the optical fiber when the fiber is held by the gripping means and the ferrule rests in the indentation, the curved portion connected to the inclined portion;

the inclined portion extending a distance X along the parallel line from the indentation and the curved portion having a radius of Y with the point of rotation of the curved portion being on a line perpendicular to the parallel line where X is about 0.090 inches (2250 μm) and Y is about 0.200 inches (5000 μm), such that when the ferrule is held by the ferrule holder with the means for providing in an unstressed state, the optical fiber connected to the ferrule extends over the platform with the platform contacting the optical fiber near the ferrule and spaced from the optical fiber farther from the ferrule;

means for scoring the fiber at a point near the ferrule;

means for providing tensile and shearing forces to the fiber at or near the scoring point to break the fiber forming an end face lying substantially in a plane substantially normal to the longitudinal axis of the fiber; and means for supporting the means for gripping, the means for holding, the means for scoring and the means for providing.

3. The apparatus of claim 2, wherein the means for gripping comprises:

a gripper arm having a first end, an intermediate portion and a second end, the arm pivotably connected to the means for supporting;

an optical fiber contact element on the arm first end for contacting the optical fiber; and a spring positioned between the means for supporting and the arm second end to bias the arm second end away from, and the optical fiber contact element towards, the means for supporting.

4. The apparatus of claim 1 or 2, wherein the indentation has a depth just deep enough to cause the optical fiber to touch the platform where the platform meets the indentation and, at the same time, to permit the ferrule to rest on the bottom of the indentation.

5. The apparatus of claim 1 or 2, wherein the means for scoring comprises:

a pair of scoring arms pivotably connected to the means for supporting;

a scoring head connected to the pair of scoring arms, the head having a passage;

a scoring blade slidably held within the passage, the blade having a scoring edge;

means for biasing the scoring blade edge towards an extended position with a variable biasing force; and a spring positioned between the scoring head and the means for gripping to bias the scoring blade away from, and the means for gripping towards, the means for supporting, whereby when the means for gripping grips the fiber, the means for holding holds the ferrule connected to the fiber and the scoring means is pivoted, the scoring blade edge swings in an arc to near the ferrule, then contacts the optical fiber, scores the optical fiber and, if a predetermined amount of pressure is exerted on the scoring blade, slides with respect to the scoring head compressing the means for biasing.

6. The apparatus of claim 5, wherein the scoring arm is pivotably connected to the means for supporting such that when the scoring blade is pivoted to contact the optical fiber, the force applied by the scoring blade on the optical fiber is substantially normal to the longitudinal axis of the fiber.

7. The apparatus of claim 5, wherein the scoring blade edge is defined by two surfaces of the scoring blade, the surfaces having an angle of or about 60 degrees between them.

8. The apparatus of claim 1 or 2, wherein the means for providing comprises:

a flexibly resilient member having a first end portion, an intermediate portion and a second end portion, the first end portion connected to the means for supporting, the intermediate portion and the second end portion extending from the means for supporting, the intermediate portion connected to the means for holding, whereby when the means for gripping grips the fiber, the means for holding holds the ferrule connected to the fiber, the fiber is scored at a point near the ferrule by the means for scoring, and the flexibly resilient member second end portion is pushed away from the means for scoring, then tensile and shearing forces are applied to the fiber at or near the scoring point to break the fiber forming an end face lying substantially in a plane substantially normal to the longitudinal axis of the fiber near the ferrule.

9. The apparatus of claim 1 or 2, wherein the scoring and breaking means is adapted to produce axial and shear forces in the fiber at or substantially at a point of scoring.

10. The apparatus of claim 1 or 2, wherein the end face is about 25 microns or less from the ferrule.

* * * * *